(12) United States Patent
Li et al.

(10) Patent No.: US 11,176,228 B2
(45) Date of Patent: Nov. 16, 2021

(54) APPLICATION INTERFACE DISPLAY METHOD, APPARATUS, AND TERMINAL, AND STORAGE MEDIUM

(71) Applicant: TENCENT TECHNOLOGY (SHENZHEN) COMPANY LIMITED, Shenzhen (CN)

(72) Inventors: Xiongzhi Li, Shenzhen (CN); Wentao Wang, Shenzhen (CN); Zhongbao Zhang, Shenzhen (CN); Hao Dong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/512,103

(22) Filed: Jul. 15, 2019

(65) Prior Publication Data
US 2019/0340343 A1 Nov. 7, 2019

Related U.S. Application Data

(63) Continuation of application No. PCT/CN2018/086378, filed on May 10, 2018.

(30) Foreign Application Priority Data

May 23, 2017 (CN) .......................... 201710368302.8

(51) Int. Cl.
| | | |
|---|---|---|
| *G06F 21/31* | (2013.01) | |
| *G06F 3/0488* | (2013.01) | |
| *G06F 21/36* | (2013.01) | |

(52) U.S. Cl.
CPC ............ *G06F 21/31* (2013.01); *G06F 3/0488* (2013.01); *G06F 21/36* (2013.01)

(58) Field of Classification Search
CPC ........ G06F 21/31; G06F 3/0488; G06F 21/36; G06F 3/0481; G09G 2358/00
See application file for complete search history.

(56) References Cited

U.S. PATENT DOCUMENTS

| | | | | |
|---|---|---|---|---|
| 8,581,877 B2* | 11/2013 | Yoo | ..................... | G06F 3/04883 345/174 |
| 10,044,846 B2* | 8/2018 | Park | ...................... | H04M 1/673 |

(Continued)

FOREIGN PATENT DOCUMENTS

| | | |
|---|---|---|
| CN | 101064602 A | 10/2007 |
| CN | 102880398 A | 1/2013 |

(Continued)

OTHER PUBLICATIONS

English Translation of KR-101083462-B1 (Year: 2011).*

(Continued)

*Primary Examiner* — Daniel B Potratz
*Assistant Examiner* — Wansik You
(74) *Attorney, Agent, or Firm* — Oblon, McClelland, Maier & Neustadt, L.L.P.

(57) ABSTRACT

Aspects of the disclosure provide methods and apparatuses for providing application interfaces. For example, a terminal device includes a display screen and processing circuitry. The processing circuitry displays, via the display screen, a fake interface for a specific application in response to a state change of the specific application. The fake interface displays non-privacy content that has no association with the specific application. Then, the processing circuitry detect an operation on the fake interface, and displays, via the display screen, an application interface of the specific application with privacy content when the operation on the fake interface satisfies a pre-defined requirement.

15 Claims, 9 Drawing Sheets

(56) References Cited

U.S. PATENT DOCUMENTS

| | | | |
|---|---|---|---|
| 10,146,582 B2* | 12/2018 | Kim | G06F 9/5027 |
| 10,346,223 B1* | 7/2019 | Sharifi | H04L 51/14 |
| 10,416,764 B2* | 9/2019 | Wanner | G06K 9/00597 |
| 10,528,174 B2* | 1/2020 | Kim | G06F 21/32 |
| 2010/0223579 A1* | 9/2010 | Schwartz | G06F 21/84 |
| | | | 715/835 |
| 2015/0026648 A1 | 1/2015 | Wu et al. | |
| 2016/0004569 A1* | 1/2016 | Kim | G06F 9/5027 |
| | | | 718/104 |

FOREIGN PATENT DOCUMENTS

| | | |
|---|---|---|
| CN | 102984349 A | 3/2013 |
| CN | 104539627 A | 4/2015 |
| CN | 104978109 | 10/2015 |
| CN | 105224364 A | 1/2016 |
| CN | 105630615 A | 6/2016 |
| CN | 106095220 A | 11/2016 |
| CN | 106446632 | 2/2017 |
| CN | 106570383 | 4/2017 |
| KR | 101083462 B1 * | 11/2011 |

OTHER PUBLICATIONS

English Translation of KR-10-1083462-B1 (Year: 2001).*
International Search Report dated Aug. 6, 2018 in PCT/CN2018/086378 filed May 10, 2018. (With English Translation) p. 1-5.
Written Opinion dated Aug. 6, 2018 in PCT/CN2018/086378 filed May 10, 2018. p. 1-3.
Office Action dated Sep. 2, 2020 in Chinese Application No. 201710368302.8 (w/partial English translation).

* cited by examiner

APPLICATION INTERFACE DISPLAY METHOD, APPARATUS, AND TERMINAL, AND STORAGE MEDIUM

RELATED APPLICATION

This application is a continuation of International Application No. PCT/CN2018/086378, filed on May 10, 2018, which claims priority to Chinese Patent Application No. 201710368302.8, entitled "APPLICATION INTERFACE DISPLAY METHOD AND APPARATUS, AND STORAGE MEDIUM" filed with the National Intellectual Property Administration, PRC on May 23, 2017. The entire disclosures of the prior applications are hereby incorporated by reference in their entirety.

FIELD OF THE TECHNOLOGY

Embodiments of this application relate to the field of terminal technologies, and in particular, to an application interface display method, apparatus, and terminal, and a storage medium.

BACKGROUND OF THE DISCLOSURE

In modern life, to meet a communication requirement of a user, various social applications are installed in a terminal. Because a lot of private information of the user is carried on an application interface of a social application, to avoid a leakage of the private information of the user, how to display the application interface of the social application becomes very vital.

In a related technology, when an application interface of a social application is displayed, the following two manners are mainly used:

In a first manner, a display screen of a terminal is locked based on a locking function provided by a third-party application; when an application interface of a social application needs to be displayed, the display screen of the terminal may be unlocked by using a corresponding unlocking password such as any one of a gesture password, a character password, or a fingerprint password, to display an icon of the social application on the display screen of the terminal; and when a tap operation on the icon of the social application is detected, the application interface of the social application is displayed.

In a second manner, a social application is locked based on a locking function provided by a third-party application; and when an application interface of the social application needs to be displayed, the social application may be unlocked by using a corresponding unlocking password such as any one of a gesture password, a character password, or a fingerprint password, to display the application interface of the social application.

However, regardless of the first manner or the second manner, when the display screen or the social application of the terminal is in an unlocked state, the application interface of the social application is always displayed. Consequently, there is a risk of a leakage of private information of a user. It can be learned that, in the related display manner, the private information of the user cannot be protected in an all-round way.

SUMMARY

Embodiments of this application provide an application interface display method, apparatus, and terminal, and a storage medium, to better protect private information of a user.

Aspects of the disclosure provide methods and apparatuses for providing application interfaces. For example, a terminal device includes a display screen and processing circuitry. The processing circuitry displays, via the display screen, a fake interface for a specific application in response to a state change of the specific application. The fake interface displays non-privacy content that has no association with the specific application. Then, the processing circuitry detect an operation on the fake interface, and displays, via the display screen, an application interface of the specific application with privacy content when the operation on the fake interface satisfies a pre-defined requirement.

In an embodiment, the processing circuitry displays, via the display screen, the fake interface for the specific application, in response to at least one of a switching from a running stop state to a starting state and a switching from an inactive state to an active state.

In an example, the processing circuitry displays, via the display screen, the fake interface for the specific application in response to a switching between a foreground display state and a background display state. In another example, the processing circuitry displays, via the display screen, the fake interface for the specific application in response to a switching from the foreground display state to a defocus state. The specific application enters the defocus state when another application having an association relationship with the specific application is invoked in the specific application. In another example, the processing circuitry displays, via the display screen, the fake interface for the specific application in response to a switching from the foreground display state to an application process list display state.

In some embodiments, the processing circuitry detects a touch operation on a specific object in the fake interface, and displays, via the display screen, a detailed interface of the specific object when the touch operation on the specific object in the fake interface does not satisfy the pre-defined requirement.

In some embodiments, the processing circuitry displays, via the display screen, an unlocking interface that prompts for inputting a password when the operation on the fake interface satisfies the pre-defined requirement. Further, the processing circuitry receives an unlocking password from the unlocking interface, and compares the unlocking password with a pre-stored unlocking password. Then, the processing circuitry displays, via the display screen, the application interface of the specific application with the privacy content when the unlocking password matches the pre-stored unlocking password.

In some examples, the processing circuitry determines, in response to the state change of the specific application, a private display mode according to a configuration file of the specific application that is used to select one of the private display mode and a normal display mode. Then, the processing circuitry displays, via the display screen and in response to the determination of the private display mode, the fake interface for the specific application. Further, in an example, the processing circuitry determines, in response to the state change of the specific application, the normal display mode according to the configuration file of the specific application and displays, via the display screen and in response to the determination of the normal display mode, the application interface of the specific application.

The technical solutions provided in the embodiments of this application bring about the following beneficial effects: a fake interface corresponding to a specific application is displayed when a status of the specific application changes, the fake interface being an application interface that has no association relationship with the specific application and that is of a non-secret-involved (e.g., non-privacy) content. Based on the fake interface, it is very difficult for another user to find an unlocking entrance of the specific application, and even if the unlocking entrance is found, the application interface is displayed only after the unlocking interface is successfully unlocked. Compared with the related technology, such an application interface display manner is more friendly and private, and can protect private information of a user in an all-round way.

BRIEF DESCRIPTION OF THE DRAWINGS

To describe the technical solutions in embodiments of this application more clearly, the following briefly describes the accompanying drawings required for describing the embodiments of this application. The accompanying drawings in the following description show merely some embodiments of this application, and a person of ordinary skill in the art may derive other drawings from these accompanying drawings.

DESCRIPTION OF EMBODIMENTS

To make objectives, technical solutions, and advantages of the embodiments of this application clearer, the following further describes in detail the embodiments of this application with reference to the accompanying drawings.

With development of Internet technologies, information security has become particularly important. To ensure user information security, a social application involving private information (such as identity information, bank card information, or a session record) of a user is often locked and protected. After a display screen or a social application of a terminal is unlocked by using a corresponding unlocking password such as any one of a gesture password, a character password, or a fingerprint password, an application interface of the social application may be displayed. Such a manner of directly displaying an unlocking interface of the social application cannot achieve an objective of protecting the private information of the user in many cases, but instead attracts more attention of another user to the social application. In addition, in such an application interface display manner, the application interface of the social application is always displayed, provided that the display screen or the social application is in an unlocked state, leading to a leakage of the private information of the user.

To protect private information of a user in an all-round way, an embodiment of this application provides an application interface display method. In the method, a fake interface corresponding to a social application is displayed when it is detected that a status of the social application changes. The fake interface is an application interface of another application (such as a calendar application, a word application, or a weather application) irrelevant to the social application. Based on the displayed fake interface, it is very difficult for another user to learn that an application is hidden by the fake interface, and cannot learn that the application is a social application. Even if the another user recognizes that a social application is hidden by the fake interface, an application interface of the social application can be displayed only after a correct unlocking entrance is found from the fake interface and successful unlocking is performed. According to the method provided in this embodiment of this application, the fake interface, and the unlocking entrance and an unlocking password of the fake interface are set, to protect the private information of the user in an all-round way.

Figure 1A:
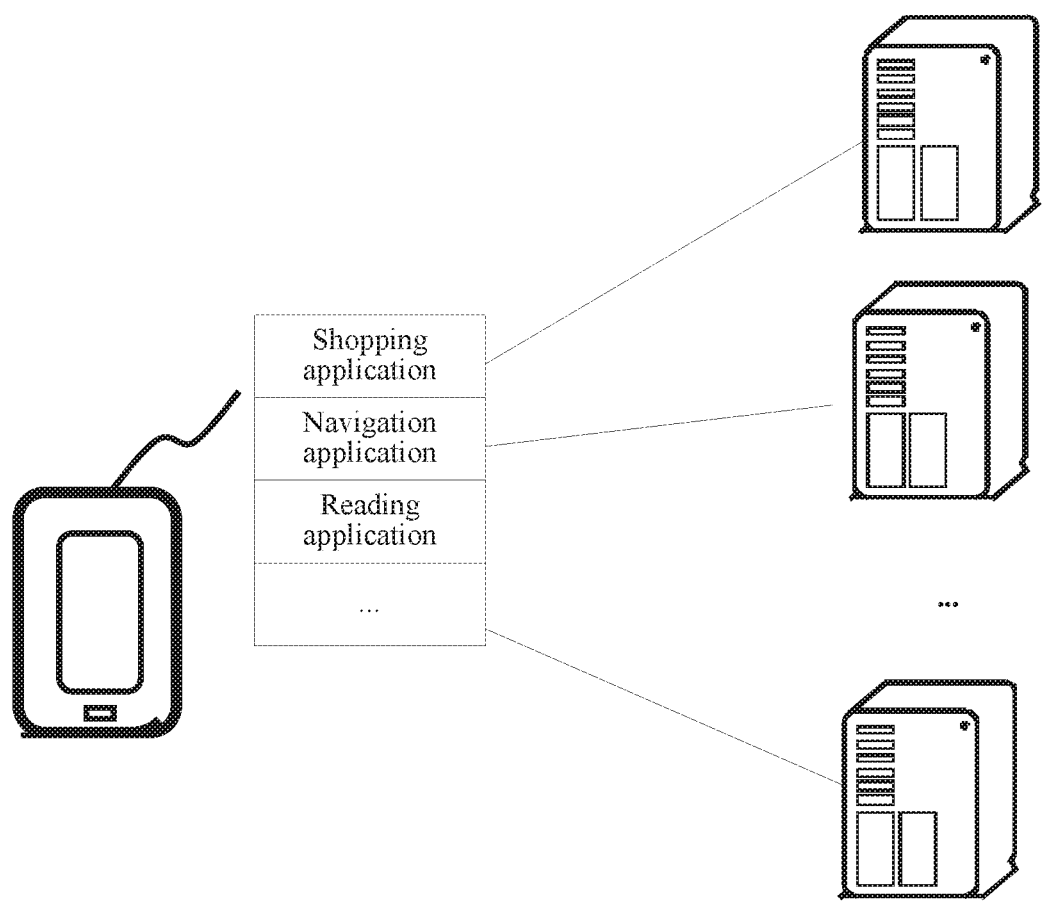
FIG. 1(A) is a schematic diagram of an implementation environment used in an application interface display method according to an embodiment of this application.
Figure 1B:
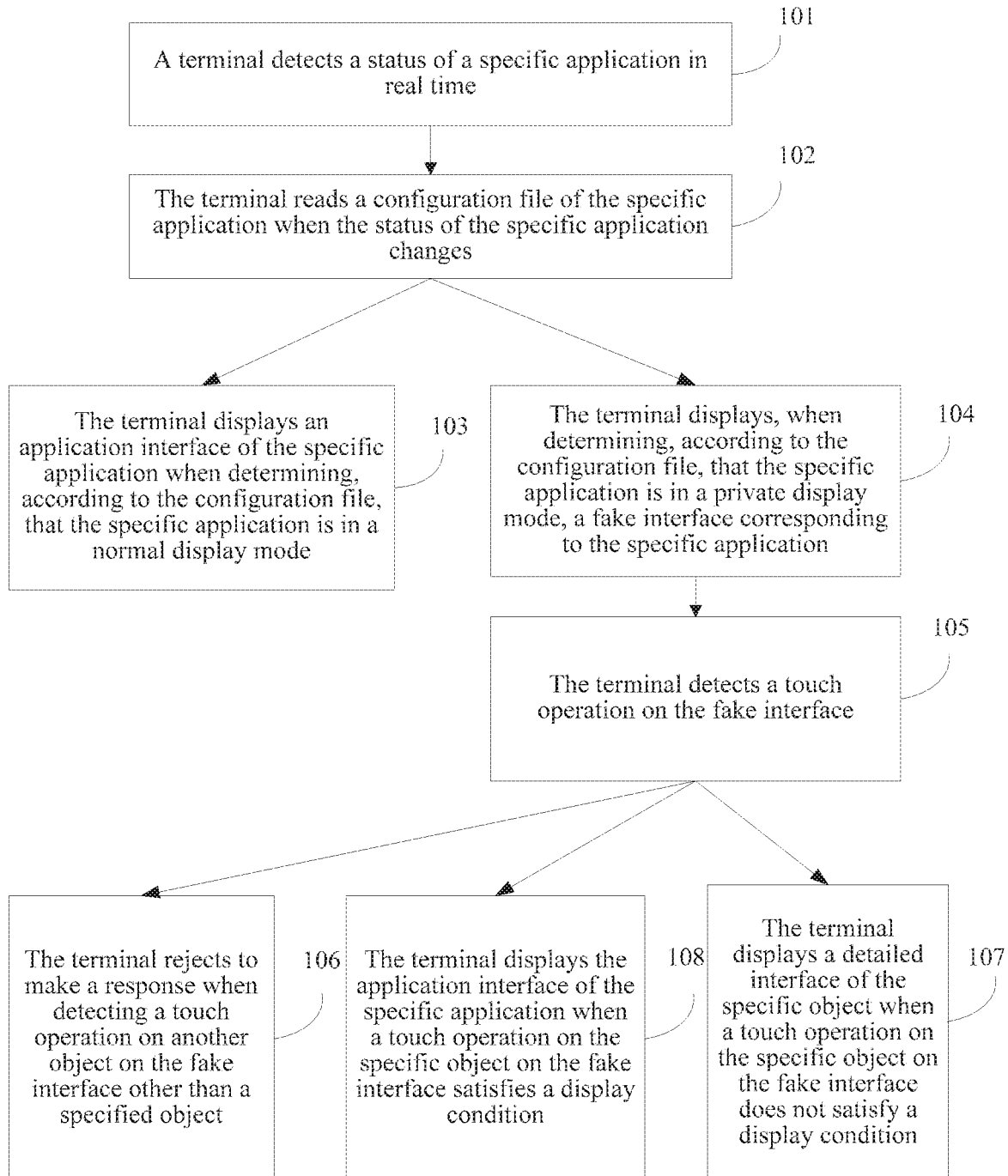
FIG. 1(B) is a flowchart of an application interface display method according to an embodiment of this application.

An embodiment of this application provides an application interface display method. The method is applied to a terminal. The terminal may be a device such as a smartphone, a tablet computer, a notebook computer, or a desktop computer. To meet a use requirement of a user, referring to FIG. 1(A), various applications are installed in the terminal, and each application corresponds to one application server. Based on the installed application, the terminal obtains a service provided by the application server. The applications in the terminal may be classified into a secret-involved application and a non-secret-involved application according to whether private information of the user is involved. The secret-involved application is an application involving the private information, property security, or the like of the user, and may be a shopping application, a payment application, a social application, or the like. The non-secret-involved application is an application not involving the private information, property security, or the like of the user, and may be a word application, a calendar application, a weather application, an audio play application, a shopping application, a reading application, a video play application, an information display application, an image application, or the like. The information display application is used for obtaining information in aspects of entertainment, sports, society, military, and the like from the Internet. Referring to FIG. 1(B), a procedure of the method provided in this embodiment of this application includes the following steps:

101: The terminal detects a status of a specific application in real time.

The specific application may be a secret-involved application such as a shopping application, a payment application, or a social application. In this embodiment of this application, the terminal may detect a running status and a display status of the specific application, to determine whether the status of the specific application changes. When detecting that the running status or the display status of the specific application changes, the terminal may determine that the status of the specific application changes, and then display an application interface of the specific application in different display manners according to a display mode of the terminal.

The running status change includes switching from a running stop state to a starting state, switching from an inactive state to an active state, or the like. The starting state is a state when the specific application is started, the inactive state is an inoperable state of the specific application during running, and the active state is an operable state of the specific application during running.

The change of the display status includes switching between a foreground display state and a background display state, switching from the foreground display state to a defocus state, switching from the foreground display state to an application process list display state, and the like. A process list is used for carrying an application process of each application run on the terminal, and the process list display status is a display status of each run application process displayed by the terminal. The defocus state is a state of the specific application when an application having an association relationship with the specific application is invoked in the specific application. The application having an association relationship with the specific application may be an application having a same function as the specific application, or may be an application bound to the specific application in advance, or certainly, may be another application that can be invoked by the specific application. The application having an association relationship with the specific application is not specifically limited in this embodiment of this application.

For different states of the specific application, when the terminal detects, in real time, whether the status of the specific application changes, the following several cases are included, but this is not limited thereto:

In a first case, the terminal detects the running status of the specific application in real time, and when detecting that the running status of the specific application changes, may determine that the status of the specific application changes.

In the first case, in this embodiment of this application, the terminal detects, in real time, whether the specific application is switched from the running stop state to the starting state; and when detecting that the specific application is switched from the running stop state to the starting state, the terminal may determine that the status of the specific application changes.

In the first case, in this embodiment of this application, the terminal detects, in real time, whether the specific application is switched from the inactive state to the active state, and when detecting that the specific application is switched from the inactive state to the active state, the terminal may determine that the status of the specific application changes.

In a second case, the terminal detects the display status of the specific application in real time, and when detecting that the display status of the specific application changes, may determine that the status of the specific application changes.

In the second case, in this embodiment of this application, the terminal detects, in real time, whether the specific application is switched between the foreground display state and the background display state, and when detecting that the specific application is switched from the foreground display state to the background display state, or the specific application is switched from the background display state to the foreground display state, the terminal may determine that the status of the specific application changes.

In the second case, in this embodiment of this application, during running of the specific application program, the terminal detects, in real time, an operation of invoking the application having an association relationship with the specific application, and when detecting the operation of invoking the application having an association relationship with the specific application, and detecting that the specific application is switched from the foreground display state to the defocus state, the terminal may determine that the status of the specific application changes. For example, the specific application may be set to an application A, applications installed in the terminal and having an association relationship with the specific application is an application B and an application C. When the terminal detects an operation of invoking the application B, the terminal triggers the application A to be switched from the foreground display state to the defocus state.

In the second case, in this embodiment of this application, during running of the specific application, the terminal detects, in real time, an operation of starting another application, and when detecting that the another application is in the starting state, and the specific application is switched from the foreground display state to a state in which the specific application is covered by the another application, the terminal may determine that the status of the specific application changes.

In the second case, in this embodiment of this application, the terminal detects, in real time, whether the specific application is switched from the foreground display state to the application process list display state, and when detecting that the specific application is switched from the foreground display state to the application process list display state, the terminal may determine that the status of the specific application changes.

Certainly, in addition to the foregoing manner of detecting whether the status of the specific application changes, another manner may also be used for detection. Details are not described one by one in this embodiment of this application.

102: The terminal reads a configuration file of the specific application when the status of the specific application changes.

To enable a user to independently select whether to lock and protect the specific application, in the method provided in this embodiment of this application, a display mode setting interface is further provided. The user may select different display modes on the display mode setting interface according to a requirement of the user. The terminal detects a setting operation of the user, to obtain a configuration file corresponding to the display mode, and store the configuration file in a local memory. The local memory includes at least one of a volatile memory (such as a memory) and a non-volatile memory (such as a hard disk and other suitably storage device).

Based on the configuration file stored in the local memory, during running of the specific application, when detecting that the status of the specific application changes, the terminal may read the configuration file from the local memory. Because the configuration file can indicate the display mode of the specific application, the terminal can determine, according to the configuration file, the display mode corresponding to the specific application. The display mode includes a private display mode and a normal display mode. The private display mode is used for triggering the terminal to display, when the status of the specific application changes, a fake interface corresponding to the specific application, and the normal display mode is used for triggering the terminal to normally display the application interface of the specific application when the status of the specific application changes.

A process in which the terminal reads the configuration file of the specific application is described below by using FIG. 2 as an example.

Figure 2:
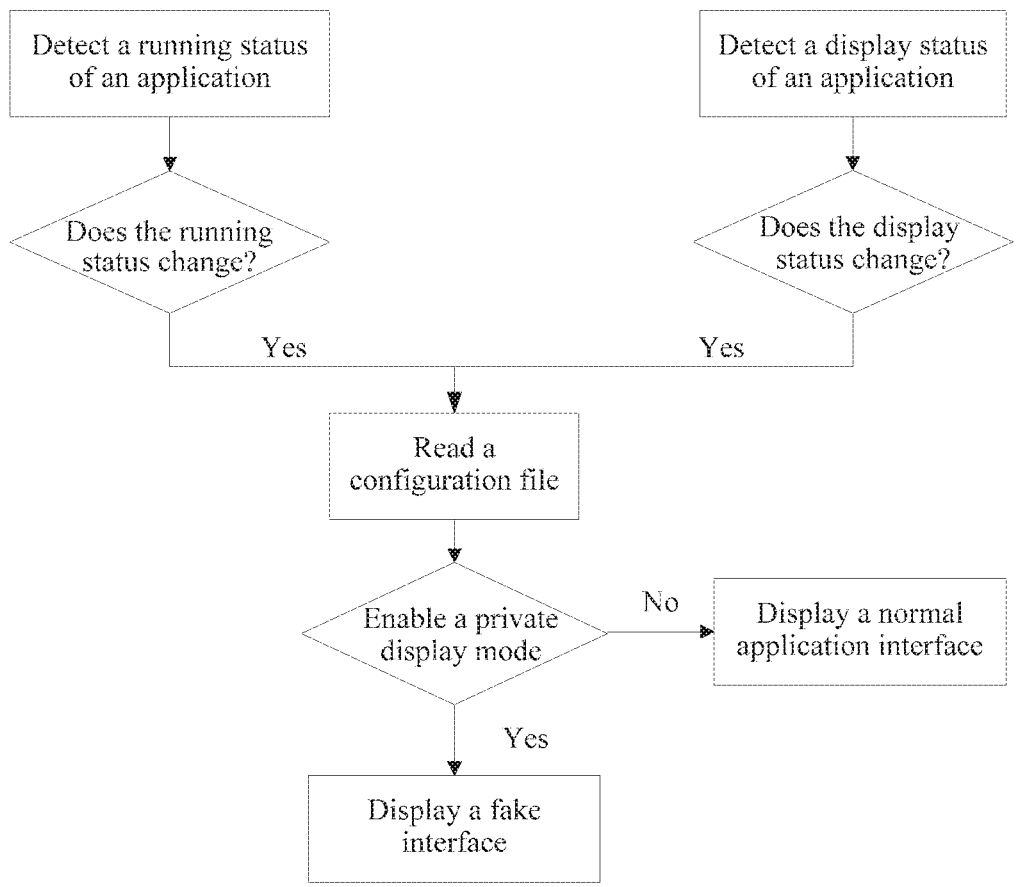
FIG. 2 is a schematic diagram of a display mode determining process according to an embodiment of this application.

Referring to FIG. 2, the terminal detects the running status and the display status of the specific application in real time, and when detecting that the running status or the display status of the specific application changes, the terminal reads the configuration file from the local memory, and reads a mode parameter of the display mode of the specific application from the configuration file, to determine the display mode of the specific application according to the read mode parameter. When determining that the specific application is in the normal display mode, the terminal displays the application interface of the specific application by performing step 103; or when determining that the specific application is in the private display mode, the terminal displays the application interface of the specific application by performing step 104 to step 109.

103: The terminal displays an application interface of the specific application when determining, according to the configuration file, that the specific application is in a normal display mode.

When the specific application is in the normal display mode, when detecting that the status of the specific application changes, the terminal may directly display the application interface of the specific application, without protecting the specific application by taking more protection measures.

104: The terminal displays, when determining, according to the configuration file, that the specific application is in a private display mode, a fake interface corresponding to the specific application.

When determining that the specific application is in the private display mode, when detecting that the status of the specific application changes, to better protect private information of the user, the terminal displays the fake interface corresponding to the specific application. The fake interface is an application interface that has no association relationship with the specific application and that is of a non-secret-involved application. Specifically, the fake interface may be one of an application interface of a word application, an application interface of a calendar application, an application interface of a weather application, an application interface of an audio play application, an application interface of a shopping application, an application interface of a reading application, an application interface of a video play application, an application interface of an information display application, an application interface of an image application, one or more images or the like.

Figure 3:
FIG. 3 is a schematic diagram of an application interface according to an embodiment of this application.
Figure 4:
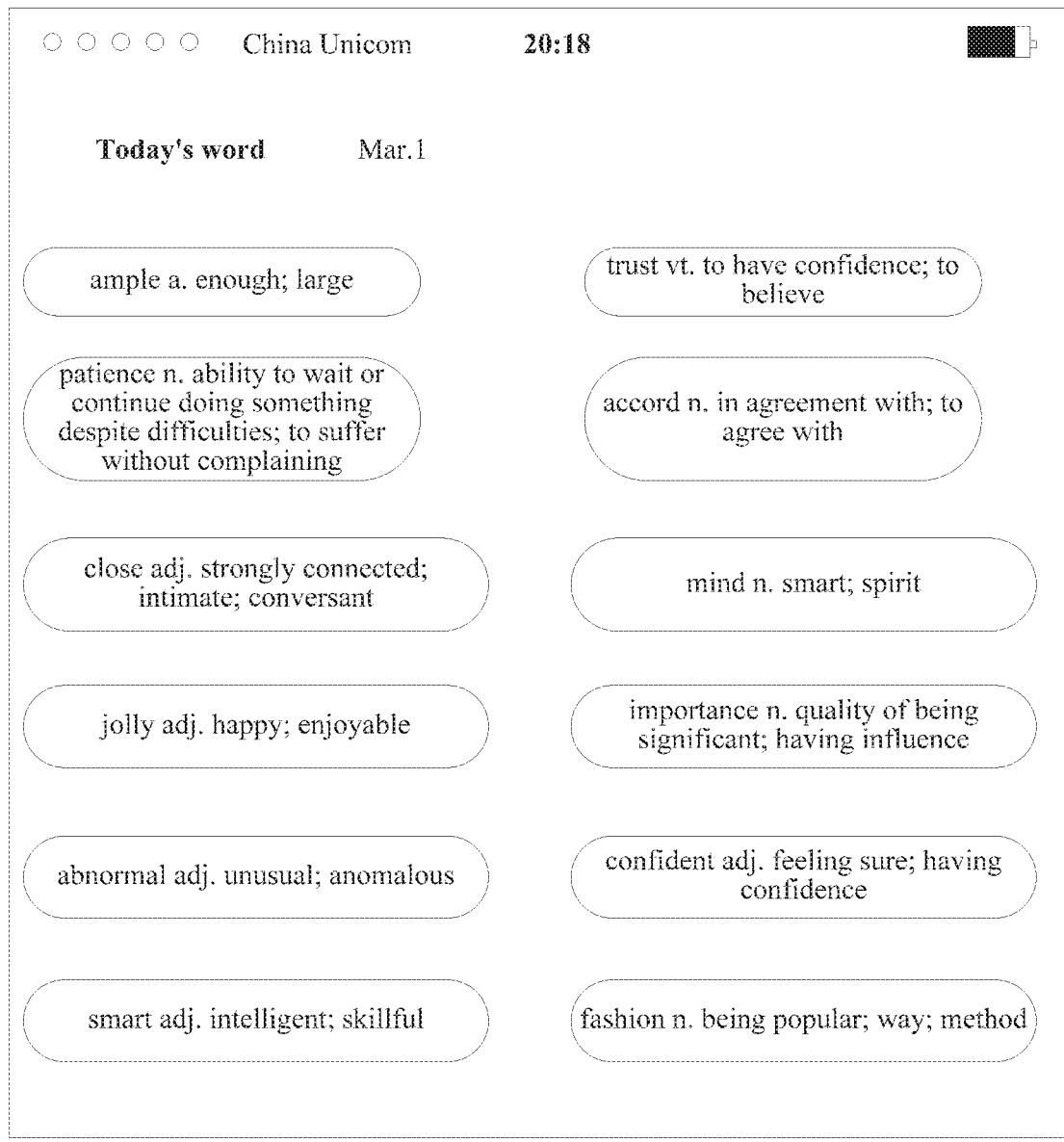
FIG. 4 is a schematic diagram of an application interface of a word application according to an embodiment of this application.
Figure 5:
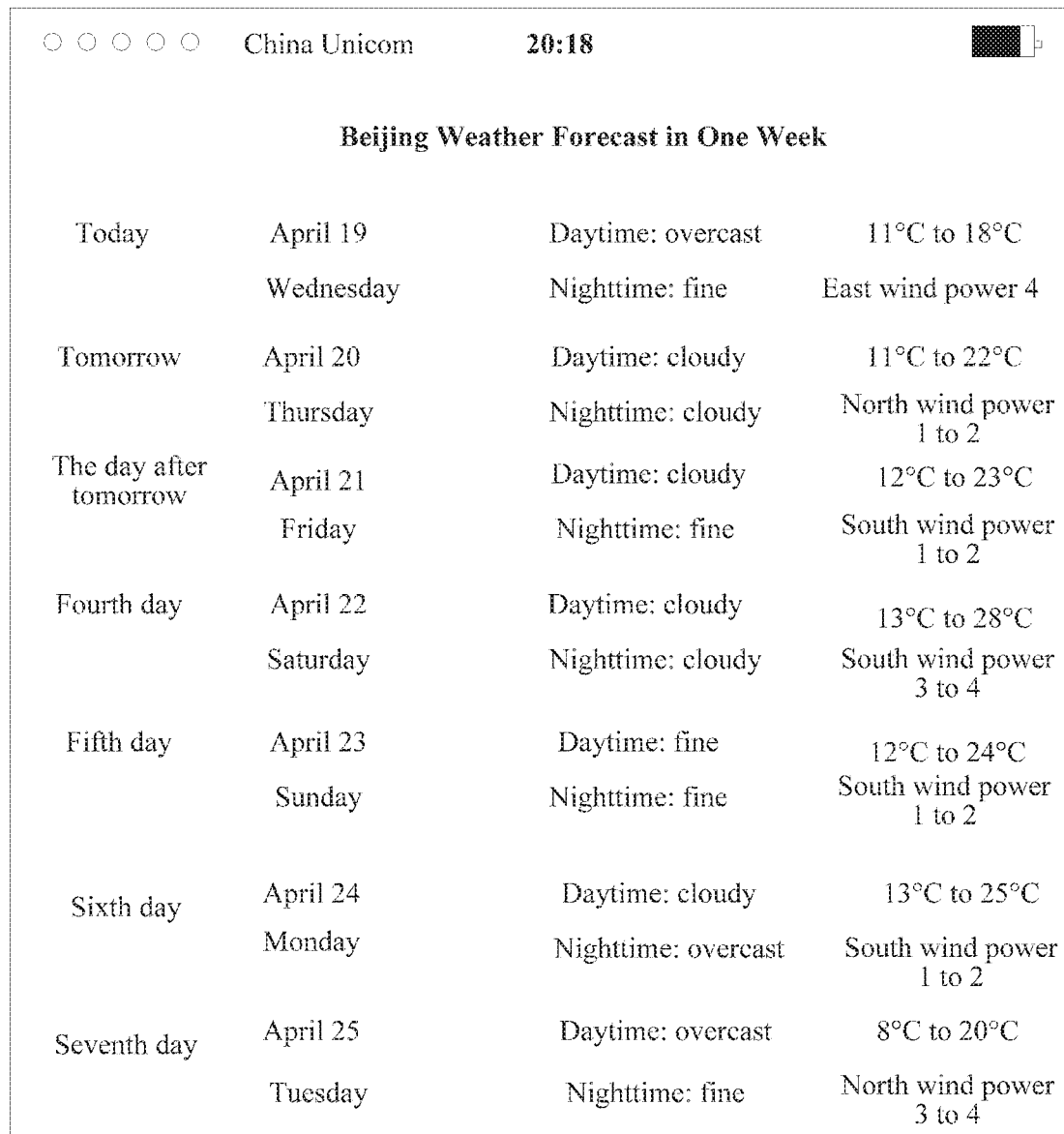
FIG. 5 is a schematic diagram of an application interface of a weather application according to an embodiment of this application.
Figure 6:
FIG. 6 is a schematic diagram of an application interface of a calendar application according to an embodiment of this application.

An example in which the specific application is a social application is used. FIG. 3 shows an application interface of the social application, and a session record of the user with another user or group is displayed on the application interface. When it is detected that the status of the social application changes, to better protect the private information of the user, the terminal displays the fake interface corresponding to the social application. Specifically, if a non-secret-involved application having no association relationship with the specific application is a word application, an application interface of the word application shown in FIG. 4 may be displayed; if a non-secret-involved application having no association relationship with the specific application is a weather application, an application interface of the weather application shown in FIG. 5 may be displayed; or if a non-secret-involved application having no association relationship with the specific application is a calendar application, an application interface of the calendar application shown in FIG. 6 may be displayed.

According to the method provided in this embodiment of this application, the application interface that has no association relationship with the specific application and that is of the non-secret-involved application is displayed, so that the specific application is successfully disguised, and when another user flips through the application interface of the terminal, even if the another user sees the specific application, the another user has no doubt about the specific application, thereby effectively avoiding a leakage of the private information of the user.

105: The terminal detects a touch operation on the fake interface.

The touch operation includes any operation that can be detected on the fake interface, such as a tap operation, a long press operation, or a slide operation. When the terminal detects the touch operation on the fake interface, the following manner is included, but this is not limited thereto: When the user performs the touch operation on the fake interface, the terminal detects a change of pressure on the fake interface by using a built-in pressure sensor, obtains a location area with a pressure change, and then compares the location area with the pressure change with a location area in which each object on the fake interface is located. The object on the fake interface includes all content on the fake interface such as an image, a text, or an icon.

To help the user view the specific application, in the method provided in this embodiment of this application, a display condition is further set. The display condition includes a specified object and a preset touch manner. The specified object is an entrance on the fake interface that is used for unlocking the fake interface, and there is at least one specified object. For different fake interfaces, specified objects that are set by the user are different. If the fake interface is the application interface of the word application, the specified object may be at least one word option. If the fake interface is the application interface of the calendar application, the specified object may be at least one date option. If the fake interface is the application interface of the weather application, the specified object may be at least one weather option. If the fake interface is the application interface of the audio play application, the specified object may be at least one song option. If the fake interface is the application interface of the shopping application, the specified object may be at least one type of commodity option. If the fake interface is the application interface of the reading application, the specified object may be at least one ebook option or at least one particular text option in an article. If the fake interface is the application interface of the video play application, the specified object may be at least one video file option. If the fake interface is the application interface of the information display application, the specified object may be at least one type of information obtaining option. If the fake interface is the image application, the specified object may be at least one image option, or the like.

The preset touch manner may be that at least one specified object is simultaneously touched, and touch duration of each specified object reaches preset duration, may be that at least one specified object is touched according to a preset sequence, and touch duration of each specified object reaches preset duration, or the like. The preset duration is set by the user, the preset duration may be 2 seconds, 3 seconds, or the like, and the preset sequence may also be set by the user.

For a case of detecting the touch operation on the fake interface, the terminal may use the following processing manner: When detecting a touch operation on another object on the fake interface other than the specified object, the terminal performs step 106. When detecting that the touch operation on the specified object on the fake interface does not satisfy the display condition, the terminal performs step 107. When detecting that the touch operation on the specified object on the fake interface satisfies the display condition, the terminal performs step 108.

106: The terminal rejects to make a response when detecting a touch operation on another object on the fake interface other than a specified object.

When it is detected that the location area with the pressure change is the same as a location area in which the another object on the fake interface other than the specified object is located, it may be determined that the touch operation is the touch operation on the another object on the fake interface other than the specified object. In this case, the terminal rejects to make a response.

107: The terminal displays a details interface of the specified object when the touch operation on the specified object on the fake interface does not satisfy a display condition.

The detecting, by the terminal, that the touch operation on the specified object on the fake interface does not satisfy a display condition, includes, but is not limited to, the following several cases:

In a first case, if it is detected that not all specified objects are touched, and the another object other than the specified object is not touched, the terminal may determine that the touch operation on the specified object on the fake interface does not satisfy the display condition. For example, the fake interface is the interface of the word application shown in FIG. 4, specified objects are an "ample" word option, a trust word option, and a patience word option, and if it is detected that only the "ample" word option and the trust word option are touched, it may be determined that the touch operation on the specified object on the fake interface does not satisfy the display condition.

In a second case, if it is detected that not all specified objects are touched, and the another object other than the specified object is touched, the terminal may determine that the touch operation on the specified object on the fake interface does not satisfy the display condition. For example, the fake interface is the interface of the word application shown in FIG. 4, specified objects are an "ample" word option, a trust word option, and a patience word option, and if it is detected that the "ample" word option, the trust word option, and an accord word option are touched, it may be determined that the touch operation on the specified object on the fake interface does not satisfy the display condition.

In a third case, if it is detected that all specified objects are touched, but a touch sequence or touch duration of the specified objects does not satisfy the preset touch manner, the terminal may determine that the touch operation on the specified object on the fake interface does not satisfy the display condition. For example, the fake interface is the interface of the word application shown in FIG. 4, specified objects are an "ample" word option, a trust word option, and a patience word option, and the preset duration is 3 seconds. If a touch manner is a simultaneous touch, when it is detected that touch duration of the "ample" word option, the trust word option, and the patience word option does not reach 3 seconds, it may be determined that the touch operation on the specified object on the fake interface does not satisfy the display condition. If a touch manner is a touch according to a sequence: the "ample" word option-the trust word option-the patience word option, when it is detected that the touch sequence is: the "ample" word option-the patience word option-the trust word option, it may be determined that the touch operation on the specified object on the fake interface does not satisfy the display condition. When it is detected that the touch sequence is: the "ample" word option-the trust word option-the patience word option, but touch duration of the patience word option is shorter than 3 seconds, it may be determined that the touch operation on the specified object on the fake interface does not satisfy the display condition.

For example, one specified object is set, and the preset duration is set to 3 seconds. If the fake interface is the application interface of the word application, when it is detected that touch duration of a specified word option on the application interface of the word application is shorter than 3 seconds, a translation interface of the word is displayed, and Chinese and English, an example sentence, and the like of the word are displayed on the translation interface. If the fake interface is the application interface of the calendar application, when it is detected that touch duration of a specified date option on the calendar application is shorter than 3 seconds, a date details interface of the specified date is displayed, and a schedule, a lunar calendar date, and the like corresponding to the specified date are displayed on the date details interface. If the fake interface is the weather application, when it is detected that touch duration of a specified weather option on the weather application is shorter than 3 seconds, a weather details interface of the specified weather is displayed, and a temperature, wind power, a dressing index, and the like are displayed on the weather details interface. If the fake interface is the application interface of the audio play application, when it is detected that touch duration of a specified song option on the audio play application is shorter than 3 seconds, the specified song is played, a song details interface of the specified song is displayed, and a song name, a singer name, an album name, and the like of the specified song are displayed on the song details interface. If the fake interface is the application interface of the shopping application, when it is detected that touch duration of a specified-type commodity option on the shopping application is shorter than 3 seconds, a commodity details interface of the specified-type commodity is displayed, and a specified-type commodity, a price of each commodity, a favorable rate, and the like are displayed on the commodity details interface. If the fake interface is the application interface of the reading application, when it is detected that touch duration of a specified ebook option on the reading application is shorter than 3 seconds, a content details interface of the specified ebook is displayed, and a book name, a catalog, content brief introduction, and the like of the specified ebook are displayed on the content details interface. If the fake interface is the application interface of the video play application, when it is detected that touch duration of a specified video file option on the video play application is shorter than 3 seconds, the specified video is played, a video details interface of the specified video file is displayed, and video content and the like of the specified video file are displayed on the video details interface. If the fake interface is the application interface of the information display application, when it is detected that touch duration of a specified-type information option on the information display application is shorter than 3 seconds, an information details interface of the specified-type information is displayed, and an information headline and the like are displayed on the information details interface of the specified-type information. If the fake interface is the application interface of the image application, when it is detected that touch duration of a specified image option on the image application is shorter than 3 seconds, an image details interface of the specified image is displayed, and a photographing time, a photographing author, and the like are displayed on the image details interface of the specified image.

108: The terminal displays the application interface of the specific application when a touch operation on the specified object on the fake interface satisfies a display condition.

When it is detected that the at least one specified object is touched, and a touch manner of each specified object satisfies the preset touch manner, it is determined that the touch operation on the specified object on the fake interface satisfies the display condition. When determining that the touch operation on the specified object on the fake interface satisfies the display condition, the terminal may display the application interface of the specific application.

For example, a quantity of specified objects is set to 1, and the preset duration is set to 3 seconds. If the fake interface is the application interface of the word application, when it is detected that touch duration of a specified word option on the application interface of the word application reaches 3 seconds, the application interface of the specific application is displayed. If the fake interface is the application interface of the calendar application, when it is detected that touch duration of a specified date option on the calendar application reaches 3 seconds, the application interface of the specific application is displayed. If the fake interface is the weather application, when it is detected that touch duration of a specified weather option on the weather application reaches 3 seconds, the application interface of the specific application is displayed. If the fake interface is the application interface of the audio play application, when it is detected that touch duration of a specified song option on the audio play application reaches 3 seconds, the application interface of the specific application is displayed. If the fake interface is the application interface of the shopping application, when it is detected that touch duration of a specified-type commodity option on the shopping application reaches 3 seconds, the application interface of the specific application is displayed. If the fake interface is the application interface of the reading application, when it is detected that touch duration of a specified ebook option on the reading application reaches 3 seconds, the application interface of the specific application is displayed. If the fake interface is the application interface of the video play application, when it is detected that touch duration of a specified video file option on the video play application reaches 3 seconds, the application interface of the specific application is displayed. If the fake interface is the application interface of the information display application, when it is detected that touch duration of a specified-type information option on the information display application reaches 3 seconds, the application interface of the specific application is displayed. If the fake interface is the application interface of the image application, when it is detected that touch duration of a specified image option on the image application reaches 3 seconds, the application interface of the specific application is displayed.

To better protect user privacy and prevent another user from attempting a plurality of times to make the touch operation on the specified object on the fake interface satisfy the display condition by chance, in this embodiment of this application, the specific application is further locked by using a locking password, and when detecting that the touch operation on the specified object on the fake interface satisfies the display condition, the terminal further displays an unlocking interface of the specific application. Based on the displayed unlocking interface, the user may enter an unlocking password on the unlocking interface, and the terminal obtains, from the unlocking interface, the unlocking password entered by the user, to perform matching between the obtained unlocking password and a pre-stored unlocking password. If the unlocking password matches the pre-stored unlocking password, the terminal displays the application interface of the specific application. If the unlocking password does not match the pre-stored unlocking password, the user is prompted in a preset prompt manner.

The locking password includes one of a fingerprint password, a character password, a gesture password, a voice password, or the like, and the locking password is not specifically limited in this embodiment of this application. The unlocking password may be a password the same as the locking password, and also includes one of a fingerprint password, a character password, a gesture password, a voice password, or the like, and the unlocking password is not specifically limited in this embodiment of this application. The preset prompt manner may be controlling a vibration motor in the terminal to vibrate at a preset frequency, or controlling an indicator in the terminal to flicker at a preset flicker frequency, or may be controlling a vibration motor in the terminal to vibrate at a preset frequency, and controlling the specified object to jitter by using a preset animation, or the like. The preset vibration frequency is set by the user, and may be vibrating three times per second, four times per second, or the like, and the preset flicker frequency is set by the user, and may be flickering eight times per second, 10 times per second, or the like.

It is noted that, a display position of the specified object on the fake interface is not fixed. Each time it is detected that the display status or the running status of the specific application changes, a position of the specified object on the fake interface correspondingly changes, to avoid a case in which another user obtains the private information of the user because the another user peeps at a touch position of the user and unlocks the specific application. For example, the fake interface is a display interface of the word application shown in FIG. 4. A display position of the "ample" word option on the word application that is used for unlocking the fake interface is the upper left corner of the display interface of the word application in FIG. 4, when it is detected next time that the display status or the running status of the specific application changes, the display position of the "ample" word option on the display interface of the word application changes, for example, changes to the upper right corner, the lower right corner, the middle, or another position.

A display process of the application interface is described below with reference to FIG. 4, FIG. 5, FIG. 6, and FIG. 7.

Figure 7:
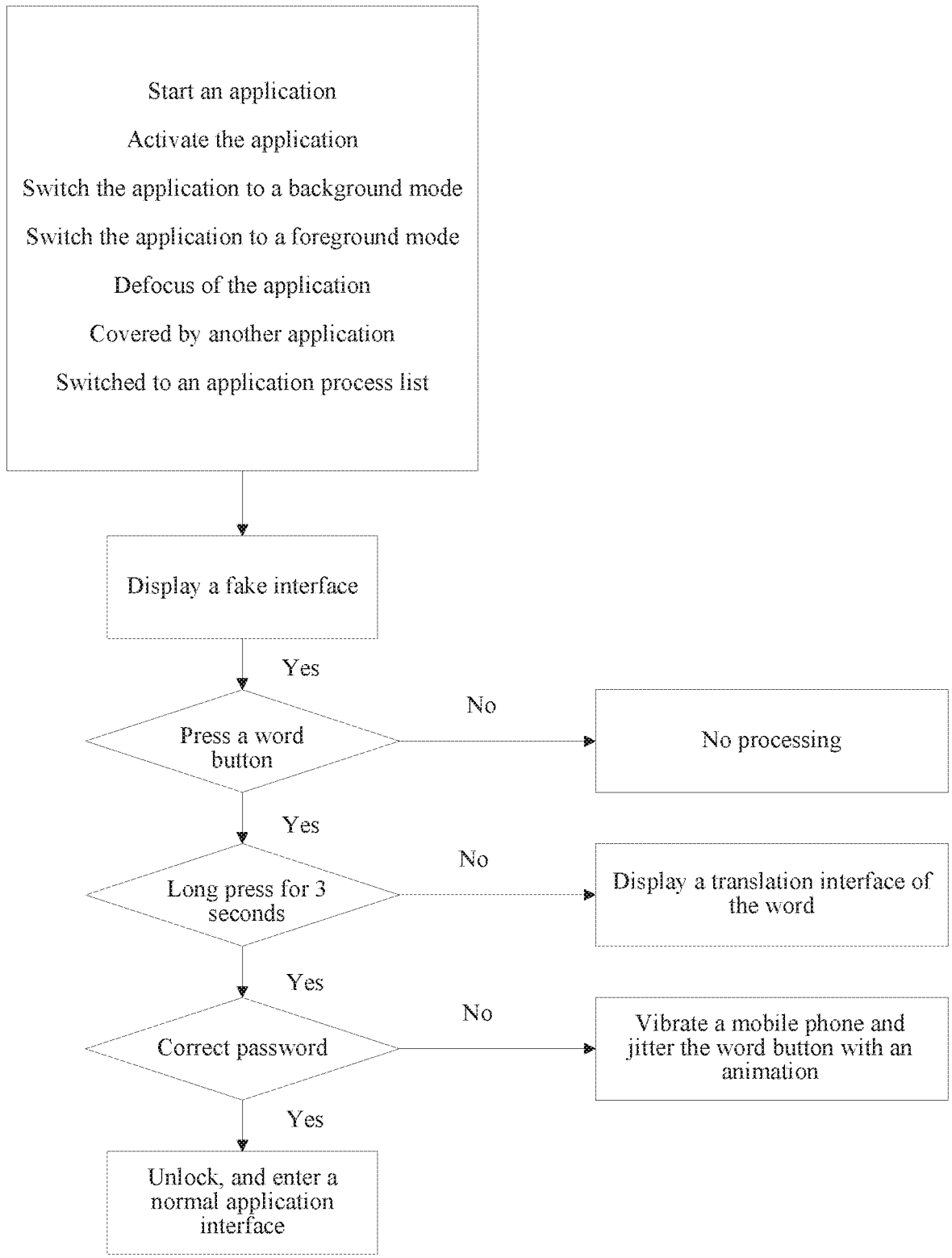
FIG. 7 is a schematic diagram of an application interface display process according to an embodiment of this application.

Referring to FIG. 7, during running of the specific application, when detecting that the specific application is switched from the running stop state to the starting state, or the specific application is switched from the inactive state to the active state, or the specific application is switched between the foreground display state and the background display state, or the specific application is switched from the foreground display state to the defocus state, or the specific application is switched from the foreground display state to the state in which the specific application is covered by another application, or the specific application is switched from the foreground display state to the application process list display state, the terminal reads the preset configuration file, and when determining, according to the configuration file, that the specific application is in the private display mode, the terminal displays the fake interface corresponding to the specific application. The fake interface is the application interface of the word application shown in FIG. 4. If the specified object that is set by the user is the "ample" word option, when detecting a touch operation of the user on another word option on the application interface of the word application other than the "ample" word option, the terminal rejects to make a response. When detecting that touch duration of the user for the "ample" word option is shorter than 3 seconds, the terminal displays a translation interface of the "ample" word option. When detecting that touch duration of the user for the "ample" word option is longer than 3 seconds, the terminal displays the unlocking interface, obtains the unlocking password from the unlocking interface, performs matching between the unlocking password and the preset unlocking password, and if the unlocking password matches the preset unlocking password, displays the application interface of the specific application, or if the unlocking password does not match the preset unlocking password, vibrates a mobile phone and controls the "ample" word option to jitter with an animation to prompt the user.

Referring to FIG. 7, during running of the specific application, when detecting that the specific application is switched from the running stop state to the starting state, or the specific application is switched from the inactive state to the active state, or the specific application is switched between the foreground display state and the background display state, or the specific application is switched from the foreground display state to the defocus state, or the specific application is switched from the foreground display state to the state in which the specific application is covered by another application, or the specific application is switched from the foreground display state to the application process list display state, the terminal reads the preset configuration file, and when determining, according to the configuration file, that the specific application is in the private display mode, the terminal displays the fake interface corresponding to the specific application. The fake interface is the application interface of the weather application shown in FIG. 5. If the specified object that is set by the user is weather in the daytime on April 19, when detecting a touch operation of the user on another weather option on the application interface of the calendar application other than the weather in the daytime on April 19, the terminal rejects to make a response. When detecting that touch duration of the user for the weather option in the daytime on April 19 is shorter than 3 seconds, the terminal displays a details interface of the weather in the daytime on April 19. When detecting that touch duration of the user for the weather option in the daytime on April 19 is longer than 3 seconds, the terminal displays the unlocking interface, obtains the unlocking password from the unlocking interface, performs matching between the unlocking password and the preset unlocking password, and if the unlocking password matches the preset unlocking password, displays the application interface of the specific application, or if the unlocking password does not match the preset unlocking password, vibrates a mobile phone and controls the weather option in the daytime on April 19 to jitter with an animation to prompt the user.

Referring to FIG. 7, during running of the specific application, when detecting that the specific application is switched from the running stop state to the starting state, or the specific application is switched from the inactive state to the active state, or the specific application is switched between the foreground display state and the background display state, or the specific application is switched from the foreground display state to the defocus state, or the specific application is switched from the foreground display state to the state in which the specific application is covered by another application, or the specific application is switched from the foreground display state to the application process list state, the terminal reads the preset configuration file, and when determining, according to the configuration file, that the specific application is in the private display mode, the terminal displays the fake interface corresponding to the specific application. The fake interface is the application interface of the calendar application shown in FIG. 6. If the specified object that is set by the user is a date option on April 1, when detecting a touch operation of the user on another date option on the application interface of the calendar application other than the date option on April 1, the terminal rejects to make a response. When detecting that touch duration of the user for the date option on April 1 is shorter than 3 seconds, the terminal displays a details interface of the date option on April 1. When detecting that touch duration of the user for the date option on April 1 is longer than 3 seconds, the terminal displays the unlocking interface, obtains the unlocking password from the unlocking interface, performs matching between the unlocking password and the preset unlocking password, and if the unlocking password matches the preset unlocking password, displays the application interface of the specific application, or if the unlocking password does not match the preset unlocking password, vibrates a mobile phone and controls the date option on April 1 to jitter with an animation to prompt the user.

According to the method provided in this embodiment of this application, a fake interface corresponding to a specific application is displayed when a status of the specific application changes, the fake interface being an application interface that has no association relationship with the specific application and that is of a non-secret-involved application. Based on the fake interface, it is very difficult for another user to find an unlocking entrance of the specific application, and even if the unlocking entrance is found, the application interface is displayed only after the unlocking interface is successfully unlocked. Compared with the related technology, such an application interface display manner is more friendly and private, and can protect private information of a user in an all-round way.

Figure 8:
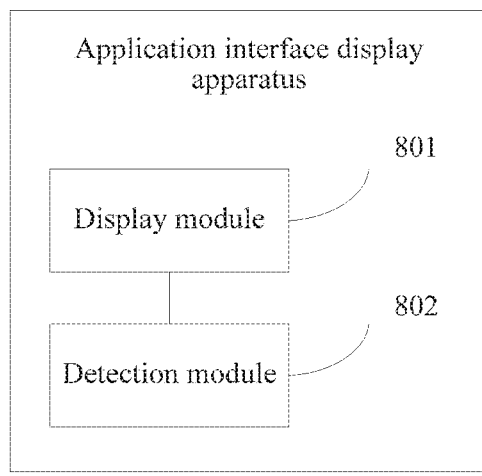
FIG. 8 is a schematic structural diagram of an application interface display apparatus according to an embodiment of this application.

Referring to FIG. 8, an embodiment of this application provides an application interface display apparatus. The apparatus is disposed in a terminal, and the apparatus includes:

a display module 801, configured to display, when a status of a specific application changes, a fake interface corresponding to the specific application, the fake interface being an application interface that has no association relationship with the specific application and that is of a non-secret-involved application, and the status of the specific application including a running status and a display status; and a detection module 802, configured to detect a touch operation on the fake interface, the display module 801 being configured to display an unlocking interface of the specific application when a touch operation on a specified object on the fake interface satisfies a display condition; and the display module 801 being configured to display an application interface of the specific application when the unlocking interface is successfully unlocked.

In another embodiment of this application, the display module 801 is configured to display, when the running status of the specific application changes, the fake interface corresponding to the specific application, where the change of the running status includes switching from a running stop state to a starting state, or switching from an inactive state to an active state.

In another embodiment of this application, the display module 801 is configured to display, when the display status of the specific application changes, the fake interface corresponding to the specific application, where the change of the display status includes switching between a foreground display state and a background display state, switching from the foreground display state to a defocus state, and switching from the foreground display state to an application process list display state; and the defocus state is a state of the specific application when an application having an association relationship with the specific application is invoked in the specific application.

In another embodiment of this application, the display module 801 is configured to display a details interface of the specified object when the touch operation on the specified object on the fake interface does not satisfy the display condition.

In another embodiment of this application, the apparatus further includes:

an obtaining module, configured to obtain an unlocking password from the unlocking interface; and a matching module, configured to perform matching between the unlocking password and a pre-stored unlocking password; and the display module 801 is configured to display the application interface of the specific application when the unlocking password matches the pre-stored unlocking password.

In another embodiment of this application, the apparatus further includes:

a file reading module, configured to read a configuration file of the specific application when the status of the specific application changes, where the configuration file is used for determining a display mode of the specific application, and the display mode includes a private display mode and a normal display mode; and the display module 801 is configured to display, when it is determined, according to the configuration file, that the specific application is in the private display mode, the fake interface corresponding to the specific application.

In another embodiment of this application, the display module 801 is configured to display the application interface of the specific application when it is determined, according to the configuration file, that the specific application is in the normal display mode.

In another embodiment of this application, the fake interface includes one of an application interface of a word application, an application interface of a calendar application, an application interface of a weather application, an application interface of an audio play application, an application interface of a shopping application, an application interface of a reading application, an application interface of a video play application, or an application interface of an information display application.

In conclusion, the apparatus provided in this embodiment of this application displays, when a status of a specific application changes, a fake interface corresponding to the specific application, the fake interface being an application interface that has no association relationship with the specific application and that is of a non-secret-involved application. Based on the fake interface, it is very difficult for another user to find an unlocking entrance of the specific application, and even if the unlocking entrance is found, the application interface is displayed only after the unlocking interface is successfully unlocked. Compared with the related technology, such an application interface display manner is more friendly and private, and can protect private information of a user in an all-round way.

Figure 9:
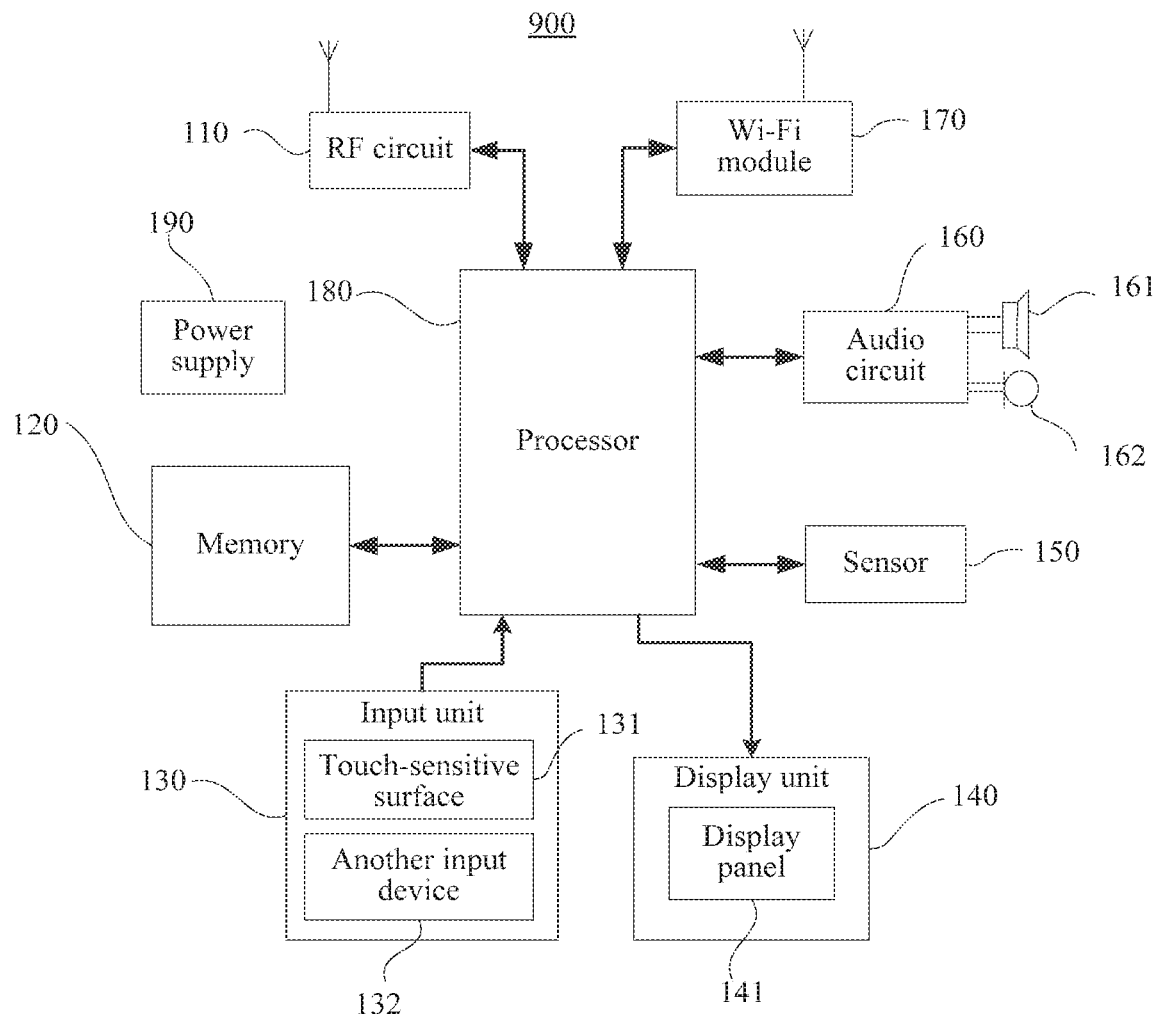
FIG. 9 is a schematic structural diagram of an application interface display terminal according to an embodiment of this application.

FIG. 9 is a schematic structural diagram of an application interface display terminal according to an embodiment of this application. The terminal may be configured to implement the application interface display method provided in the foregoing embodiment. Specifically:

The terminal 900 may include components such as a radio frequency (RF) circuit 110, a memory 120 including one or more computer-readable storage mediums, an input unit 130, a display unit 140, a sensor 150, an audio circuit 160, a wireless fidelity (Wi-Fi) module 170, a processor 180 including one or more processing cores, and a power supply 190. A person skilled in the art may understand that a structure of the terminal shown in FIG. 9 does not constitute a limitation to the terminal, and the terminal may include more or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), a duplexer, and the like. In addition, the RF circuit 110 may further communicate with another device through wireless communication and a network. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 900, and the like. In addition, the memory 120 may include a high speed random access memory, and may also include a non-volatile memory, such as at least one magnetic disk storage device, a flash memory, or another volatile solid-state storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to user setting and function control. Specifically, the input unit 130 may include a touch-sensitive surface 131 and another input device 132. The touch-sensitive surface 131, which is also referred to as a touch display screen or a touch panel, may collect a touch operation of a user on or near the touch-sensitive surface (such as an operation of the user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information entered by the user or information provided for the user, and various graphical user interfaces of the terminal 900. The graphical user interfaces may be formed by a graph, a text, an icon, a video, or any combination thereof. The display unit 140 may include a display panel 141. Optionally, the display panel 141 may be configured in a form of a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, to determine the type of the touch event. Then, the processor 180 provides a corresponding visual output on the display panel 141 according to the type of the touch event. Although, in FIG. 9, the touch-sensitive surface 131 and the display panel 141 are used as two separate parts to implement input and output functions, in some embodiments, the touch-sensitive surface 131 and the display panel 141 may be integrated to implement the input and output functions.

The terminal 900 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 900 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 900, are not further described herein.

The audio circuit 160, a speaker 161, and a microphone 162 may provide audio interfaces between the user and the terminal 900. The audio circuit 160 may transmit, to the speaker 161, an electric signal converted from received audio data. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 900.

Wi-Fi belongs to a short distance wireless transmission technology. The terminal 900 may help, by using the Wi-Fi module 170, a user to receive and send an email, browse a web page, access stream media, and the like. This provides wireless broadband Internet access for the user. Although FIG. 9 shows the Wi-Fi module 170, it may be understood that the Wi-Fi module 170 is not a necessary component of the terminal 900, and the Wi-Fi module 170 may be omitted as required provided that the scope of the essence of the present disclosure is not changed.

The processor 180 is the control center of the terminal 900, and is connected to various parts of the mobile phone by using various interfaces and lines. By running or executing the software program and/or module stored in the memory 120, and invoking data stored in the memory 120, the processor 180 performs various functions and data processing of the terminal 900, thereby performing overall monitoring on the mobile phone. Optionally, the processor 180 may include one or more processor cores. Optionally, the processor 180 may integrate an application processor and a modem processor. The application processor mainly processes an operating system, a user interface, an application program, and the like. The modem processor mainly processes wireless communication. It may be understood that the foregoing modem processor may not be integrated into the processor 180.

The terminal 900 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 900 may further include a camera, a Bluetooth module, and the like, and details are not described herein. Specifically, in this embodiment, the display unit of the terminal 900 is a touchscreen display. The terminal 900 further includes at least one processor and a memory. The memory is configured to store at least one instruction, at least one program, and a code set or an instruction set, and the at least one instruction, the at least one program, the code set or the instruction set is loaded and executed by the processor to implement the application interface display method shown in FIG. 1.

The terminal provided in this embodiment of this application displays, when a status of a specific application changes, a fake interface corresponding to the specific application, the fake interface being an application interface that has no association relationship with the specific application and that is of a non-secret-involved application. Based on the fake interface, it is very difficult for another user to find an unlocking entrance of the specific application, and even if the unlocking entrance is found, the application interface is displayed only after the unlocking interface is successfully unlocked. Compared with the related technology, such an application interface display manner is more friendly and private, and can protect private information of a user in an all-round way.

An embodiment of this application further provides a computer-readable storage medium. The computer-readable storage medium may be a computer-readable storage medium included in the memory in the foregoing embodiment, or may be a computer-readable storage medium that exists alone and is not assembled into a terminal. The computer-readable storage medium stores at least one instruction, at least one program, and a code set or an instruction set, and the at least one instruction, the at least one program, and the code set or the instruction set are loaded and executed by the processor to implement the application interface display method shown in FIG. 1.

According to the computer-readable storage medium provided in this embodiment of this application, a fake interface corresponding to a specific application is displayed when a status of the specific application changes, the fake interface being an application interface that has no association relationship with the specific application and that is of a non-secret-involved application. Based on the fake interface, it is very difficult for another user to find an unlocking entrance of the specific application, and even if the unlocking entrance is found, the application interface is displayed only after the unlocking interface is successfully unlocked. Compared with the related technology, such an application interface display manner is more friendly and private, and can protect private information of a user in an all-round way.

An embodiment of this application provides a graphical user interface. The graphical user interface is used on an application interface display terminal. The application interface display terminal includes a touchscreen display, a memory, and one or more processors configured to execute one or more programs.

According to the graphical user interface provided in this embodiment of this application, a fake interface corresponding to a specific application is displayed when a status of the specific application changes, the fake interface being an application interface that has no association relationship with the specific application and that is of a non-secret-involved application. Based on the fake interface, it is very difficult for another user to find an unlocking entrance of the specific application, and even if the unlocking entrance is found, the application interface is displayed only after the unlocking interface is successfully unlocked. Compared with the related technology, such an application interface display manner is more friendly and private, and can protect private information of a user in an all-round way.

It is noted that, when the application interface display apparatus and terminal provided in the foregoing embodiments display an application interface, only division of the foregoing functional modules is described by using an example. During actual application, the foregoing functions may be allocated to different functional modules and accomplished according to requirements, that is, internal structures of the application interface display apparatus and terminal are divided into different functional modules, to implement all or some of the functions described above. In addition, the embodiments of the application interface display apparatus and terminal provided in the foregoing embodiments belong to a same concept as the embodiment of the application interface display method. For the specific implementation processes of the application interface display apparatus and terminal, refer to the method embodiments, and details are not described herein again.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory, a magnetic disk, an optical disc, or the like.

The foregoing descriptions are merely preferred embodiments of this application, but are not intended to limit the embodiments of this application. Any modification, equivalent replacement, or improvement made within the spirit and principle of this application shall fall within the protection scope of the embodiments of this application.

What is claimed is:

1. A method for providing application interface in a terminal device, the method comprising:
    displaying, by processing circuitry of the terminal device and on a display screen of the terminal device according to a configuration file of a specific application, a fake interface of a plurality of fake interfaces, wherein the fake interface is displayed in place of the specific application that has privacy content, that is currently installed on the terminal device, in response to a state change of the specific application which includes at least one of a switching from a running stop state to a starting state and a switching from an inactive state to an active state, the fake interface displaying non-privacy content that includes a type of content different from, and has no association with, any content within the specific application;
    detecting, by the processing circuitry of the terminal device, an operation on a plurality of specific objects that are displayed in the fake interface;
    displaying, by the processing circuitry of the terminal device and on the display screen of the terminal device, an application interface of the specific application with privacy content when the operation on the plurality of specific objects in the fake interface satisfies a pre-defined requirement; and
    displaying, by the processing circuitry, a detailed interface related to at least one of the plurality of specific objects when the operation on the at plurality of specific objects in the fake interface does not satisfy the pre-defined requirement,
    wherein the pre-defined requirement includes simultaneously touching the plurality of specific objects for a preset duration, and
    wherein a quantity of specific objects of the plurality of specific objects and the preset duration are separately set by a user for each of the plurality of different fake interfaces.

2. The method according to claim 1, further comprising:
    displaying, the fake interface for the specific application in response to at least one of:
        a switching between a foreground display state and a background display state;
        a switching from the foreground display state to a defocus state; and a switching from the foreground display state to an application process list display state, the specific application entering the defocus state when another application having an association relationship with the specific application is invoked in the specific application.

3. The method according to claim 1, further comprising:
displaying, an unlocking interface that prompts for inputting a password when the operation on the fake interface satisfies the pre-defined requirement;
receiving, an unlocking password from the unlocking interface;
comparing the unlocking password with a pre-stored unlocking password; and
displaying, the application interface of the specific application with the privacy content when the unlocking password matches the pre-stored unlocking password.

4. The method according to claim 1, further comprising:
determining, in response to the state change of the specific application, a private display mode according to the configuration file of the specific application that is used to select one of the private display mode and a normal display mode; and
displaying, in response to the determination of the private display mode, the fake interface for the specific application.

5. The method according to claim 4, further comprising:
determining, in response to the state change of the specific application, the normal display mode according to the configuration file of the specific application; and
displaying, in response to the determination of the normal display mode, the application interface of the specific application.

6. The method according to claim 1, wherein
the specific application that has privacy content is one of a social application, a payment application, and a shopping application, and
the plurality of fake interfaces includes at least one of a word application, a calendar application, a weather application, and a media playback application.

7. A terminal device for providing application interfaces, comprising:
a display screen; and
processing circuitry configured to:
display, via the display screen according to a configuration file of a specific application, a fake interface of a plurality of fake interfaces, wherein the fake interface is displayed in place of the specific application that has privacy content, that is currently installed on the terminal device, in response to a state change of the specific application which includes at least one of a switching from a running stop state to a starting state and a switching from an inactive state to an active state, the fake interface displaying non-privacy content that includes a type of content different from, and has no association with, any content within the specific application;
detect an operation on a plurality of specific objects that are displayed in the fake interface;
display, via the display screen, an application interface of the specific application with privacy content when the operation on the plurality of specific objects in the fake interface satisfies a pre-defined requirement; and
display a detailed interface related to at least one of the plurality of specific objects when the operation on the plurality of specific objects in the fake interface does not satisfy the pre-defined requirement,
wherein the pre-defined requirement includes simultaneously touching the plurality of specific objects for a preset duration, and
wherein a quantity of the specific objects of the plurality of specific objects and the preset duration are separately set by a user for each of the plurality of different fake interfaces.

8. The terminal device according to claim 7, wherein the processing circuitry is further configured to:
display, via the display screen, the fake interface for the specific application in response to at least one of:
a switching between a foreground display state and a background display state;
a switching from the foreground display state to a defocus state; and
a switching from the foreground display state to an application process list display state, the specific application entering the defocus state when another application having an association relationship with the specific application is invoked in the specific application.

9. The terminal device according to claim 7, wherein the processing circuitry is further configured to:
display, via the display screen, an unlocking interface that prompts for inputting a password when the operation on the fake interface satisfies the pre-defined requirement;
receive an unlocking password from the unlocking interface;
compare the unlocking password with a pre-stored unlocking password; and
display, via the display screen, the application interface of the specific application with the privacy content when the unlocking password matches the pre-stored unlocking password.

10. The terminal device according to claim 7, wherein the processing circuitry is further configured to:
determine, in response to the state change of the specific application, a private display mode according to the configuration file of the specific application that is used to select one of the private display mode and a normal display mode; and
display, via the display screen and in response to the determination of the private display mode, the fake interface for the specific application.

11. The terminal device according to claim 10, wherein the processing circuitry is further configured to:
determine, in response to the state change of the specific application, the normal display mode according to the configuration file of the specific application; and
display, via the display screen and in response to the determination of the normal display mode, the application interface of the specific application.

12. A non-transitory computer-readable medium storing instructions which when executed by a computer cause the computer to perform
displaying, on a display screen of the computer according to a configuration file of a specific application, a fake interface of a plurality of fake interfaces, wherein the fake interface is displayed in place of the specific application that has privacy content, that is currently installed on the terminal device, in response to a state change of the specific application which includes at least one of a switching from a running stop state to a starting state and a switching from an inactive state to an active state, the fake interface displaying non-privacy content that includes a type of content different from, and has no association with, any content within the specific application;

detecting an operation on a plurality of specific objects that are displayed in the fake interface;

displaying, on the display screen of the computer, an application interface of the specific application with privacy content when the operation on the plurality of specific objects in the fake interface satisfies a pre-defined requirement; and displaying a detailed interface related to at least one of the plurality specific objects when the operation on the plurality of specific objects in the fake interface does not satisfy the pre-defined requirement, wherein the pre-defined requirement includes simultaneously touching the plurality of specific objects for a preset duration, and wherein a quantity of the specific objects of the plurality of specific objects and the preset duration are separately set by a user for each of the plurality of different fake interfaces.

13. The non-transitory computer-readable medium according to claim 12, wherein the instructions further cause the computer to perform:

displaying, the fake interface for the specific application in response to at least one of:
    a switching between a foreground display state and a background display state;
    a switching from the foreground display state to a defocus state; and
    a switching from the foreground display state to an application process list display state, the specific application entering the defocus state when another application having an association relationship with the specific application is invoked in the specific application.

14. The non-transitory computer-readable medium according to claim 12, wherein the instructions further cause the computer to perform:

displaying, an unlocking interface that prompts for inputting a password when the operation on the fake interface satisfies the pre-defined requirement;

receiving, an unlocking password from the unlocking interface;

comparing the unlocking password with a pre-stored unlocking password; and displaying, the application interface of the specific application with the privacy content when the unlocking password matches the pre-stored unlocking password.

15. The non-transitory computer-readable medium according to claim 12, wherein the instructions further cause the computer to perform:

determining, in response to the state change of the specific application, a private display mode according to the configuration file of the specific application that is used to select one of the private display mode and a normal display mode; and displaying, in response to the determination of the private display mode, the fake interface for the specific application.

* * * * *